UNITED STATES PATENT OFFICE.

FIN SPARRE, OF WILMINGTON, DELAWARE, ASSIGNOR TO E. I. DU PONT DE NEMOURS AND COMPANY. OF WILMINGTON, DELAWARE, A CORPORATION OF DELAWARE.

PYROXYLIN COMPOSITION.

1,301,187.   Specification of Letters Patent.   Patented Apr. 22, 1919.

No Drawing.   Application filed March 10, 1917.   Serial No. 153,858.

*To all whom it may concern:*

Be it known that I, FIN SPARRE, of Wilmington, in the county of Newcastle, and in the State of Delaware, have invented a certain new and useful Improvement in Pyroxylin Compositions, and do hereby declare that the following is a full, clear, and exact description thereof.

My invention relates particularly to pyroxylin compositions capable of use for many different purposes, as for example wherever pyroxylin plastics are used and in connection with the manufacture of artificial leather, although it has many other uses.

The object of my invention is to provide a pyroxylin composition which may be provided with a pigment, which pigment is of such a nature that it does not have a detrimental effect upon the constituents in the pyroxylin composition as for example the nitro-cellulose, and oils when the latter are present. It has previously been found that when zinc oxid is used as a white pigment in pyroxylin compositions that it has a detrimental effect upon the nitro-cellulose because of its strong basic nature. Pyroxylin compositions in which zinc oxid is a constituent have a tendency to turn yellow and become brittle, owing to the tendency of the zinc oxid to decompose the nitro-cellulose. Furthermore, in pyroxylin compositions in which oils are used the zinc oxid has a detrimental effect as there is a tendency for the oils to be decomposed by the zinc oxid, thus making the coating brittle in a short time.

The object of my invention is to provide compositions containing titanium oxid as a pigment so as to avoid the detrimental effect produced by the presence of zinc oxid.

A further object is to provide a constituent in the place of the zinc oxid which has a very great covering power.

Further objects of my invention will appear from a detailed description thereof contained hereinafter.

While my invention is capable of embodiment in many different forms, for the purpose of illustration I shall describe only certain forms thereof hereinafter.

For example, I may provide a pyroxylin plastic containing a suitable solvent such as ethyl alcohol mixed with other constituents in the following proportions:

100 parts nitrocellulose
35 parts camphor
15 parts titanium oxid

As another example of my invention, I may provide a coating composition adapted to be applied to a woven fabric so as to produce artificial leather which composition may be comprised of a solvent such as a mixture of ethyl alcohol, benzol and ethyl acetate and the following constituents in the proportions given, as follows:

$1\frac{1}{2}$ parts castor oil
1 part nitrocellulose
$1\frac{1}{4}$ parts titanium oxid The oil in the last mentioned composition is used as a softening agent. If desired, the amount of solvent in this composition may be varied so as to give the composition the character of a plastic. The titanium oxid present in the above compositions will not have the tendency to decompose the nitro-cellulose that was present in previous compositions of a similar nature containing zinc oxid, and furthermore, the titanium oxid will not decompose the oil contained in the second example of my invention above referred to, as was the case in previous compositions of a similar nature containing oil and zinc oxid. The proportions of titanium oxid in the above compositions may be smaller and other pigments may be used to make up the difference.

While I have described my invention above in detail, I wish it to be understood that many changes may be made therein without departing from the spirit of my invention. For example, the proportions may vary greatly.

I claim:

1. A nitro-cellulose composition containing titanium oxid.
2. A nitro-cellulose composition containing titanium oxid and an oil.
3. A nitro-cellulose composition containing titanium oxid and a volatile solvent.

4. A nitro-cellulose composition containing titanium oxid, an oil, and a volatile solvent.

5. A coating composition adapted to be applied to a woven fabric to produce artificial leather comprising castor oil, nitro-cellulose and titanium oxid.

6. A coating composition adapted to be applied to a woven fabric to produce artificial leather comprising a vegetable oil, nitrocellulose, titanium oxid and sufficient volatile solvent to give the composition a plastic character.

7. A coating composition adapted to be applied to a woven fabric to produce artificial leather comprising castor oil one and one-half parts, nitro-cellulose one part, titanium oxid one and one-quarter parts and sufficient volatile solvent comprising ethyl alcohol, benzol and ethyl acetate to give the composition a plastic character.

In testimony that I claim the foregoing I have hereunto set my hand.

FIN SPARRE.

Witnesses:
P. E. STRICKLAND,
H. J. HAWKE, Jr.